A. J. ALBRACHT & J. WESSEL.
FARM MACHINERY.
APPLICATION FILED APR. 2, 1914.
1,138,720.
Patented May 11, 1915.
2 SHEETS—SHEET 1.
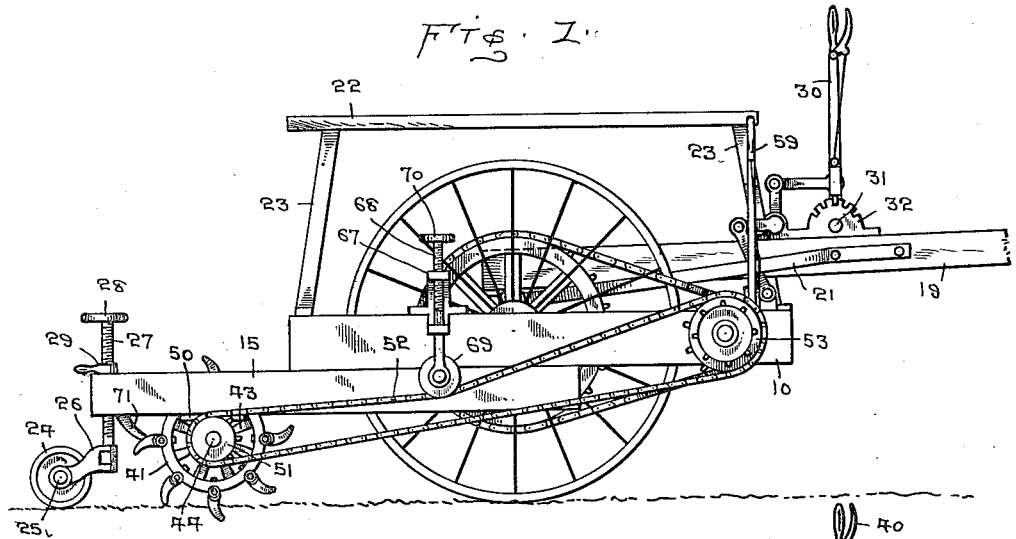
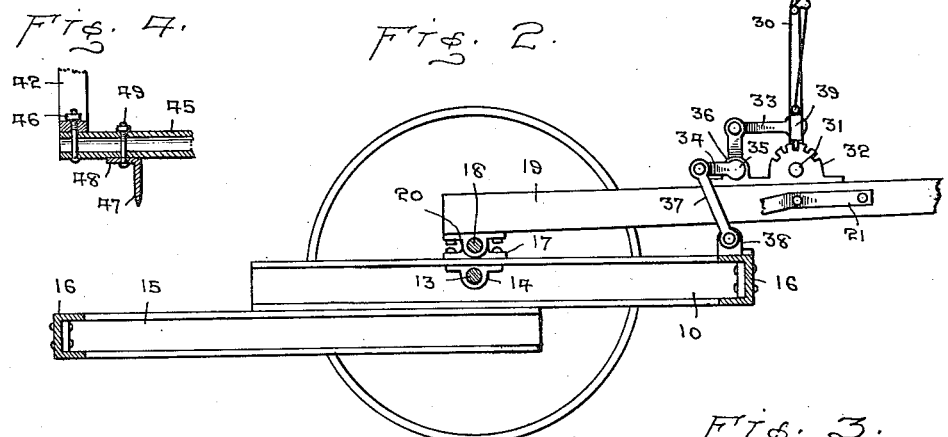
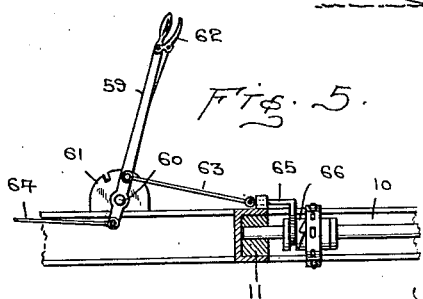
WITNESSES
Thos. W. Riley
C. W. P. Newbold
A. J. Albracht and J. Wessel
INVENTORS
W. J. Fitzgerald & Co.
Attorneys

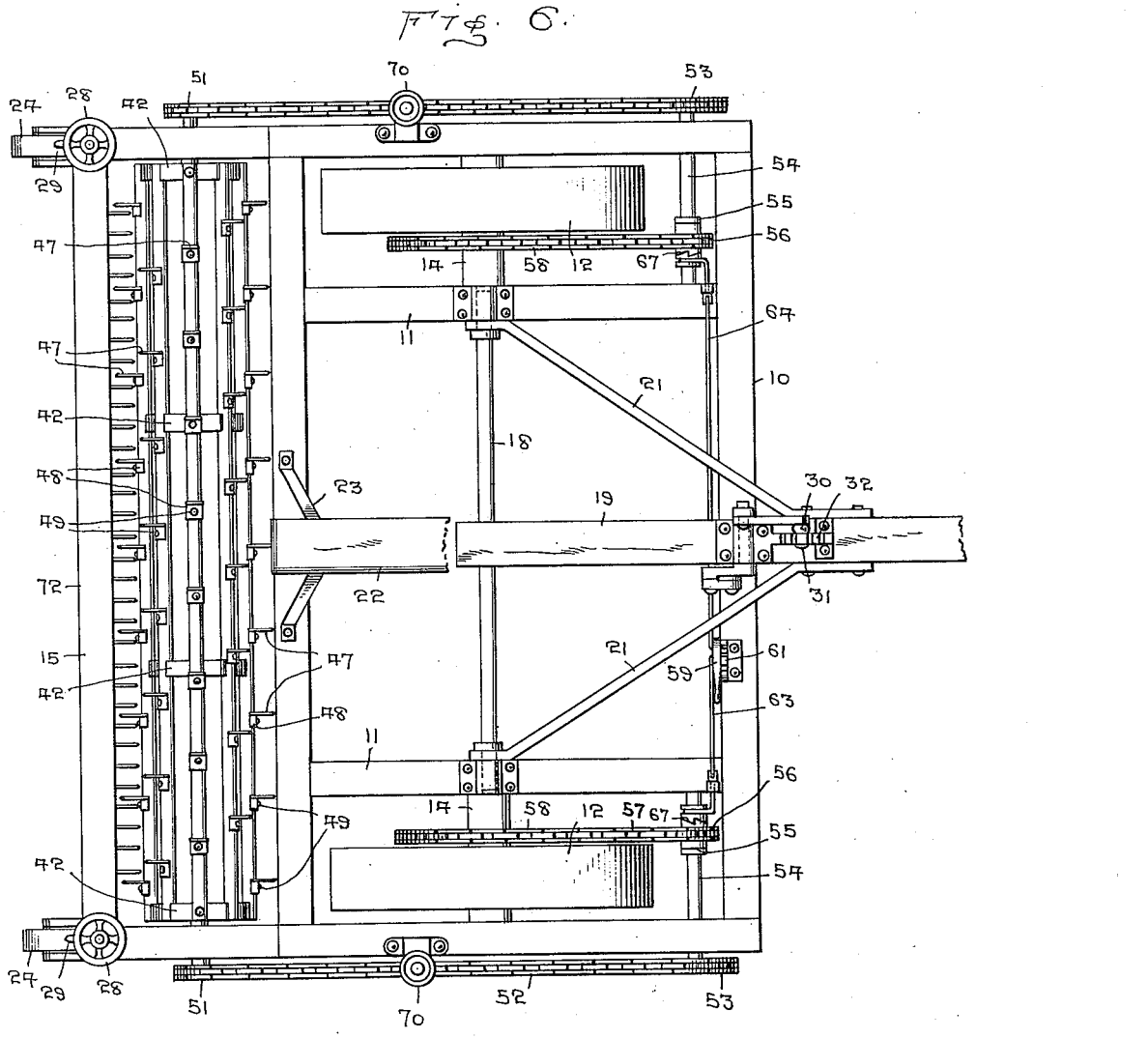

UNITED STATES PATENT OFFICE.

ANTON J. ALBRACHT AND JOSEPH WESSEL, OF LINDSAY, NEBRASKA.

FARM MACHINERY.

1,138,720.

Specification of Letters Patent. Patented May 11, 1915.

Application filed April 2, 1914. Serial No. 828,969.

*To all whom it may concern:*

Be it known that we, ANTON J. ALBRACHT and JOSEPH WESSEL, citizens of the United States, residing at Lindsay, in the county of Platte and State of Nebraska, have invented certain new and useful Improvements in Farm Machinery; and we do hereby declare the following to be a full, clear, and exact description of the invention, such as will enable others skilled in the art to which it appertains to make and use the same.

This invention relates broadly to farm machinery and has particular references to that class of machines which are known as pulverizers.

As a principal object this invention contemplates the provision of a pulverizer which shall combine in one machine, means capable of accomplishing work usually intrusted to a number of machines now in use such as the ordinary form of disk pulverizer, stalk cutter, and harrow.

A further object is to provide a farm machine of the type described which may be used for rendering a field even and smooth by pulverizing or grinding the upper surface of the ground and at the same time cutting and intermixing therewith the stumps of corn stalks previously planted in the field.

A still further object is to provide a machine of this character which shall be readily thrown out of engagement with the ground when it is desired to transport the machine from place to place such as from the barn to the field without causing its operation.

A still further object is to provide a pulverizing roller adapted for use in connection with this machine which shall be driven by certain connections with the drive wheel and which shall have connection with means for engaging or disengaging such driving connection.

The above and additional objects are accomplished by such means as are illustrated in the accompanying drawings, described in the following specification and then more particularly pointed out in the claim which is appended hereto and forms a part of this application.

With reference to the drawings, wherein we have illustrated the preferred embodiment of our invention as it is reduced to practice and throughout the several views of which like characters of reference designate similar parts, Figure 1 is a side elevational view of our machine as a whole, part of the tongue connected therewith, however, being broken away, Fig. 2 is a longitudinal section through our machine showing in diagram, the operation of certain coacting parts, Fig. 3 is a fragmentary detail showing the manner in which the blades or teeth of the pulverizer are connected thereto, Fig. 4 is a sectional view of the matter shown in Fig. 3, such section being taken on the line 4—4 of that figure, Fig. 5 is an enlarged front elevation of the clutch mechanism as used in connection with our machine and, Fig. 6 is a top plan view of the matter shown in Fig. 1, parts being broken away.

Proceeding now to the description of the drawings and having particular reference to Figs. 2 and 6, it will be seen that the main or body portion of our machine consists of the substantially rectangular frame 10 suitably braced by the transverse beams 11, positioned adjacent each end of the frame 10. The wheels 12, upon which this machine is adapted to travel are rotatably mounted upon the stub axles 13, which are in turn suitably mounted in the bearings 14, carried by the frame 10, and the cross beams 11. A second rectangular frame member 15, is supported by the frame 10 in the manner clearly shown in Fig. 2, both of these frames being preferably formed from U-iron as at 16 in that figure.

Mounted in brackets 17, carried by the cross beams 11, and similar to brackets 14 also carried by said cross beams is positioned the transverse axle 18, to which the tongue 19 of the machine is pivoted by means of a suitable bracket 20. This tongue 19, is supported and reinforced by the bracing bars 21, which are loosely mounted upon the axle 18 at one end and rigidly secured to the tongue 19 at their other extremities.

A platform seat 22, is carried by the frame 10 by means of supports 23, so that the driver or operator of our machine shall have ready access to the controlling means therefor, such means being hereinafter more fully described. At the two rearward extremities of the lower frame 15, we have provided the caster wheels 24 suitably journaled as at 25 in the bifurcated arms 26, said arms carrying the threaded upstanding member 27 which is provided with the hand wheel 28 for adjustment and is adapted to pass through the frame 15 and to be adjustably secured therein. Such adjustment as will be readily seen upon reference to the drawings can easily be made by rotating the hand wheel 28 in the direction calculated to produce an upward or downward movement of the rear portion of the frame 15, which ever may be desired and also includes the suitable lock nut 29 by which the member 27 is removably secured in any desired adjusting position.

Further controlling means adapted to operate upon the frame members 10 and 15 and designed to provide for the engagement or disengagement of the pulverizer to be hereinafter more fully described includes the hand lever 30, pivoted at 31 to segmental rack 32 and connected by means of the link 33 to a bell crank 34, which is pivoted at 35 to the ear 36 which is formed integrally with the rack 32. This bell crank 34, is pivotally connected by the link 37 to the ear 38, carried on the forward portion of the frame 10. It will readily be seen that a forward movement of this lever 30 from the neutral position shown in Fig. 2 will engage the pulverizer even more deeply with the ground surface and lower the rear portion of the frame 15 and that a backward movement of the lever 30 will have the reverse effect of elevating said rear portion of the frame 15 and consequently disengage the pulverizer from contact with the ground. The customary locking means 39 operated by the usual hand grip 40, have been provided for this lever 30, in order to hold it in the position desired by the driver.

Coming now to the description of the pulverizer member proper as indicated at 41 as a whole it will be seen upon reference to Fig. 6 in which this portion of our invention is most clearly shown that a plurality of disks 42, are provided with the spokes 43, which connect with the hub of said disks, the latter being rigidly attached to a shaft 44 so that the disks rotate therewith. Semi-circular recesses are provided in the outer periphery of these disks at spaced intervals in which the pipes 45 are adapted to seat and in which they are secured by means of the bolts 46. The teeth 47 which are adapted to be carried by these pipes 45 are formed with the flange 48 which is curved to conform with the outer circumference of said pipes and are held rigidly thereagainst by means of bolts 49.

The shaft 44 carrying the above described disks is rotatably mounted in a suitable bracket 50 which depends from the frame 15 adjacent its rearmost extremity. This shaft also carries upon its outer ends the sprocket wheels 51 which are adapted to be driven by means of a chain 52 by the larger sprocket which is attached to the stub shafts 54. These shafts 54, are journaled in the ends of the frame 10, and the cross beams 11, and carry thereupon the loosely mounted sleeve 55 upon which is mounted the sprocket wheel 56 adapted to be driven by means of the chain 57, by the large sprocket 58 which is keyed upon the shafts 13 and is rotated by the movement of the wheels.

This brings us to the description of the clutch mechanism which is an important element of our invention and provides for the ready disengagement of the driving mechanism so that the vehicle may travel without operating the pulverizer. The means for accomplishing this object include the double hand lever 59 pivoted at 60 to the segmental racks 61, and provided with the usual locking means 62 for holding the lever in either of its positions. Pivotally connected to this lever 59 at points equidistant from the pivot 60, one above and the other below are the links 63 and 64 which are connected at their other ends with yokes 65 loosely mounted on the slidable sleeve 66 which is provided with the customary teeth 67 for meshing with similar teeth formed in the loosely mounted collar 55.

It has been thought best in connection with the driving mechanism for operating the pulverizer of our machine to provide a suitable chain tightener as is illustrated in Fig. 1, of the drawings. This tightener includes the bracket 67 secured to the frame 10 in the manner shown and adapted for use with the threaded shank 68 which is bifurcated at its lower end to rotatably receive the wheel 69. The upper portion of this shank is provided with the hand wheel 70 and it will be apparent that rotation of this hand wheel will result in a downward movement of the shank and consequent tightening of the chain 52. It has also been found highly desirable to provide some sort of cleaning means for the teeth 47 of the pulverizer in order that this machine may continue to do its work in an efficient manner. The cleaner which has been adopted for use in connection with this invention is shown in Figs. 1 and 6 and consists of the spaced teeth 71 which are connected to the rear member 72 of the lower frame 15 in an obvious manner and as will be seen afford a reliable means for removing clods, stalks and other material which may be impaled by the teeth 47.

The operation of our farm machine will be readily apparent from the foregoing detailed description it only being necessary to bear in mind that the adjustment of the rear caster wheels 24 and of the chain tightening wheel 69 is designed to be made before the machine is put into actual use upon the field so that when the machine is so being used the driver or operator has but to so manipulate from his seat 22, the lever 30 and 59 as circumstances may dictate.

While in the foregoing we have shown in the drawings and described in the specification such combination and arrangement of elements as constitute the preferred embodiment of our invention, we desire to emphasize the fact that we may make such minor changes in the matters of proportion and degree, in later adaptations of our device as shall not alter the spirit of our invention as defined in the appended claim.

What we claim is:

A machine of the class described, comprising a frame, drive wheels mounted within said frame, a pulverizer mounted in the rear end of said frame, a tongue pivotally mounted centrally of said frame, a segmental rack bar arranged upon said tongue in proximity to the forward end of said frame, a bearing arranged upon the base plate of said rack bar, a bell crank lever revolubly mounted in said bearing, an operating lever pivotally connected to said rack bar, a link connecting said lever with one arm of said bell crank lever, a link connecting the other arm of said bell crank lever to the forward end of said frame, whereby to actuate the forward end of said frame for raising and lowering said pulverizer at the rear end of said frame.

In testimony whereof we have signed our names to this specification in the presence of two subscribing witnesses.

ANTON J. ALBRACHT.
JOSEPH WESSEL.

Witnesses:
C. A. NEALE,
J. C. EDWARDS.